United States Patent
Minagi et al.

(10) Patent No.: US 8,795,846 B2
(45) Date of Patent: Aug. 5, 2014

(54) NI-PLATED STEEL SHEET FOR BATTERY CAN HAVING EXCELLENT PRESS FORMABILITY

(75) Inventors: Hideyuki Minagi, Yamaguchi (JP); Eiji Okamatsu, Yamaguchi (JP)

(73) Assignee: Toyo Kohan Co., Ltd., Tokyo (JP)

( * ) Notice: Subject to any disclaimer, the term of this patent is extended or adjusted under 35 U.S.C. 154(b) by 391 days.

(21) Appl. No.: 13/392,864

(22) PCT Filed: Aug. 24, 2010

(86) PCT No.: PCT/JP2010/005213
§ 371 (c)(1),
(2), (4) Date: May 9, 2012

(87) PCT Pub. No.: WO2011/024443
PCT Pub. Date: Mar. 3, 2011

(65) Prior Publication Data
US 2012/0219825 A1    Aug. 30, 2012

(30) Foreign Application Priority Data

Aug. 26, 2009  (JP) ................................ 2009-195375

(51) Int. Cl.
*C25D 5/50* (2006.01)
*C25D 5/14* (2006.01)
*H01M 2/02* (2006.01)
*C25D 5/36* (2006.01)
*C25D 3/12* (2006.01)
*C25D 7/06* (2006.01)

(52) U.S. Cl.
CPC .. *C25D 5/14* (2013.01); *C25D 5/36* (2013.01); *H01M 2/0292* (2013.01); *H01M 2/0285* (2013.01); *C25D 5/50* (2013.01); *H01M 2/0287* (2013.01); *C25D 3/12* (2013.01); *H01M 2/0275* (2013.01); *Y02E 60/12* (2013.01); *C25D 7/0614* (2013.01); *H01M 2/0262* (2013.01); *Y10S 428/935* (2013.01)

USPC .......... 428/679; 428/687; 428/935; 205/228; 205/181; 429/163

(58) Field of Classification Search
None
See application file for complete search history.

(56) References Cited

U.S. PATENT DOCUMENTS

| 8,137,835 | B2 * | 3/2012 | Tsuchida et al. | 429/163 |
| 2006/0266444 | A1 * | 11/2006 | Kosslers et al. | 148/518 |
| 2012/0171518 | A1 * | 7/2012 | Takematsu et al. | 428/679 |
| 2013/0209867 | A1 * | 8/2013 | Minagi et al. | 429/176 |

FOREIGN PATENT DOCUMENTS

| JP | 2002-143903 | * | 5/2002 |
| JP | 2005-85480 | A | 3/2005 |
| JP | 2005-149735 | A | 6/2005 |
| JP | 2007-122940 | A | 5/2007 |

OTHER PUBLICATIONS

International Search Report, mailing date Sep. 28, 2010, for corresponding International Application No. PCT/JP2010/005213.

* cited by examiner

*Primary Examiner* — John J Zimmerman
(74) *Attorney, Agent, or Firm* — Intellectual Property Law Group LLP

(57) ABSTRACT

Provided is a Ni-plated steel sheet having excellent press formability. An Fe—Ni diffusion layer and a softened Ni layer formed on the Fe—Ni diffusion layer are formed on a surface of a steel sheet corresponding to an outer surface of a battery can, a semi-bright Ni plating layer is formed on the softened Ni layer, a Ni coating weight of the Fe—Ni diffusion layer and the softened Ni layer formed on the Fe—Ni diffusion layer is set smaller than a Ni coating weight of the semi-bright Ni plating layer, and average roughness Ra of the semi-bright Ni plating layer measured by a traceable roughness gauge is 1.0 μm or more and 2.0 μm or less, and a maximum height Ry of the semi-bright Ni plating layer measured by the traceable roughness gauge is 5 μm or more and 20 μm or less.

2 Claims, No Drawings

NI-PLATED STEEL SHEET FOR BATTERY CAN HAVING EXCELLENT PRESS FORMABILITY

CROSS-REFERENCE TO RELATED APPLICATIONS

This application is a U.S. National Phase application, under 35 U.S.C. §371, of International Application no. PCT/JP2010/005213, with an international filing date of Aug. 24, 2010, and claims benefit of Japan Application no. JP 2009-195375 filed on Aug. 26, 2009, and which are hereby incorporated by reference for all purposes.

TECHNICAL FIELD

The present invention relates to a Ni-plated steel sheet for a battery can which exhibits excellent press formability.

BACKGROUND ART

Conventionally, a Ni-plated steel sheet has been popularly used as a material for manufacturing battery cans. Also, to further enhance the corrosion resistance of an outer surface of a battery can, there has been used a Ni-plated steel sheet where Ni plating is formed on a surface of a steel sheet corresponding to an outer surface of a battery can and, thereafter, a Fe—Ni diffusion layer is formed by applying heat treatment to the Ni-plated steel sheet.

As properties which such a Ni-plated steel sheet for manufacturing a battery can is required to possess, the stable press formability can be named along with the excellent battery characteristic and the excellent corrosion resistance. The stable press formability means that the scratches are not formed on a battery can and no seizure is generated at the time of press forming. Press formability is an important factor in terms of productivity for preventing a press machine from being shut down because of maintenance done on a mold.

Further, in terms of environment, there has been a demand for the reduction of the environmental load by using a non-organic solvent and non-alkali cleaning where cleaning after pressing is performed using an aqueous solution containing a surface active agent.

Accordingly, there has been a demand for a Ni-plated steel sheet which enables the manufacture of a battery can by press forming even when a water-based emulsion or a press liquid of low viscosity is used.

For example, patent document 1 (Japanese Patent 4051012) discloses a Ni-plated steel sheet for a battery can where a Fe—Ni diffusion layer or a Fe—Ni diffusion layer and a recrystallized softened Ni-plated layer which is formed on the Fe—Ni diffusion layer are formed on a surface of a steel sheet corresponding to an outer surface of the battery can, and a Ni-plated layer containing a brightening agent or a semi-brightening agent is formed on the above-mentioned layer, and an average surface roughness Ra of the Ni-plated layer is set to 0.3 µm or more. Also in such a Ni-plated steel sheet, a coating weight of the Fe—Ni diffusion layer or a coating weight of the Fe—Ni diffusion layer and the recrystallized softened Ni-plated layer formed on the Fe—Ni diffusion layer is 5 to 45 g/m$^2$ in terms of Ni (a Ni amount of the Fe—Ni diffusion layer or a total Ni amount of the Fe—Ni diffusion layer and the recrystallized softened Ni-plated layer formed on the Fe—Ni diffusion layer), and a coating weight of the Ni-plated layer containing the brightening agent or the semi-brightening agent is, in terms of Ni, 0.5 g/m$^2$ or more and less than an Ni amount of a layer below the Ni-plated layer (the Ni amount of the Fe—Ni diffusion layer or the total Ni amount of the Fe—Ni diffusion layer and the recrystallized softened Ni-plated layer formed on the Fe—Ni diffusion layer).

Further, patent document 2 (Japanese Patent 4051021) discloses a Ni-plated steel sheet for a battery can where an Fe—Ni diffusion layer is formed on a surface of a steel sheet corresponding to an outer surface of the battery can, and a Ni-plated layer containing a brightening agent or a semi-brightening agent is formed on the Fe—Ni diffusion layer, average roughness Ra of the Ni-plated layer is 0.1 µm or more and 1 µm or less, and its Rmax is 1 µm or more and 10 µm or less. Also in such a Ni-plated steel sheet, a coating weight of the Fe—Ni diffusion layer is 5 to 45 g/m$^2$ in terms of Ni and a coating weight of the Ni-plated layer containing the brightening agent or the semi-brightening agent is 0.5 to 20 g/m$^2$ in terms of Ni.

BACKGROUND ART DOCUMENT

Patent Document

Patent document 1: Japanese Patent 4051012
Patent document 2: Japanese Patent 4051021

SUMMARY OF THE INVENTION

Problems that the Invention is to Solve

However, with respect to the above-mentioned Ni-plated steel sheets disclosed in patent documents 1 and 2, at the time of using an aqueous-emulsion-based press liquid as a press liquid for a lubricant in a drawing step, scratches are generated on an outer surface of a battery can or seizure is generated on a mold thus giving rise to drawbacks concerning the quality of cans.

The present invention has been made to overcome such conventional drawbacks, and it is an object of the present invention to provide a Ni-plated steel sheet for a can having the excellent press formability while preventing the generation of scratches and the generation of seizure to a mold at the time of forming the battery can.

Means for Solving the Problems (1) The present invention is directed to a Ni-plated steel sheet for a battery can having excellent press formability, wherein
an Fe—Ni diffusion layer and a softened Ni layer formed on the Fe—Ni diffusion layer are formed on a surface of a steel sheet corresponding to an outer surface of the battery can,
a semi-bright Ni plating layer is formed on the softened Ni layer,
a Ni coating weight of the Fe—Ni diffusion layer and the softened Ni layer formed on the Fe—Ni diffusion layer is set smaller than a Ni coating weight of the semi-bright Ni plating layer,
average roughness Ra of the semi-bright Ni plating layer measured by a traceable roughness gauge is 1.0 µm or more and 2.0 µm or less, and a maximum height Ry of the semi-bright Ni plating layer measured by the traceable roughness gauge is 5 µm or more and 20 µm or less, and
surface roughness Ra' of a surface of the semi-bright Ni plating layer in an area of 2.5 µm×2.5 µm which is obtained by an atomic force microscope falls within a range from 5 to 22 nm.

(2) In the Ni-plated steel sheet for a battery can having excellent press formability having the above-mentioned constitution (1), the Ni coating weight of the Fe—Ni diffusion layer and the softened Ni layer formed on the Fe—Ni diffusion layer is 5 to 8 g/m², and the Ni coating weight of semi-bright Ni plating layer is 8 g/m² or more.

Advantageous Effects of the Invention

The present invention can provide a Ni-plated steel sheet for a can having the excellent press formability while preventing the generation of scratches and the generation of seizure to a mold at the time of forming the battery can.

MODE FOR CARRYING OUT THE INVENTION

According to an embodiment 1 of the present invention, there is provided a Ni-plated steel sheet for a battery can having excellent press formability, wherein an Fe—Ni diffusion layer and a softened Ni layer formed on the Fe—Ni diffusion layer are formed on a surface of a steel sheet corresponding to an outer surface of the battery can, a semi-bright Ni plating layer is formed on the softened Ni layer, a Ni coating weight of the Fe—Ni diffusion layer and the softened Ni layer formed on the Fe—Ni diffusion layer is set smaller than a Ni coating weight of the semi-bright Ni plating layer, average roughness Ra of the semi-bright Ni plating layer measured by a traceable roughness gauge is 1.0 µm or more and 2.0 µm or less, a maximum height Ry measured by the traceable roughness gauge is 5 µm or more and 20 µm or less, and surface roughness Ra' of a surface of the semi-bright Ni plating layer in an area of 2.5 µm×2.5 µm which is obtained by an atomic force microscope falls within a range from 5 to 22 nm.

Further, according to an embodiment 2 of the present invention, in the Ni-plated steel sheet for a battery can having excellent press formability in the above-mentioned (1), the Ni coating weight of the Fe—Ni diffusion layer and the softened Ni layer formed on the Fe—Ni diffusion layer is 5 to 8 g/m², and the Ni coating weight of the semi-bright Ni plating layer is 8 g/m² or more.

The embodiments of the present invention are explained in detail hereinafter.

<Steel Sheet>

Usually, a low carbon aluminum-killed hot-rolled coil is used as an original sheet of a Ni-plated steel sheet. Further, a coil which is formed of extremely-low carbon steel which contains 0.003 weight % or less of carbon, or a coil which is formed of non-aging continuous cast steel manufactured by adding niobium and titanium to the extremely-low carbon steel is used.

<Pretreatment Before Plating>

As pretreatment before Ni plating, usually, a scale (oxide film) formed on a surface of a cold-rolled steel sheet is removed by applying electrolytic cleaning or cleaning by immersion to the cold-rolled sheet using an alkali solution containing caustic soda as a main agent. After the scale is removed, the steel sheet is rolled to a product thickness in a cold-rolling step.

<Annealing>

After rolling oil which adheres to the steel sheet in rolling is cleaned by electrolytic cleaning, the steel sheet is annealed.

Annealing may be performed by either one of continuous annealing and box annealing, and is not limited specifically. After annealing is applied to the steel sheet, a shape of the steel sheet is modified.

<Ni Plating>

Next, Ni plating is applied to the steel sheet.

In general, although a Ni sulfate bath which is referred to as a watt bath is mainly used as a Ni plating bath, besides the Ni sulfate bath, a Ni sulfamate plating bath, a fluoroborete plating bath, a chloride bath or the like can be used. A coating weight of Ni plating in performing plating using these bathes is not specifically limited. However, a Ni coating weight is preferably set to 5 to 8/m².

In a case where the Ni coating weight is less than 5 g/m², when heat diffusion treatment is performed, a Ni layer which is softened (softened Ni layer) is not formed and the whole layer becomes the Fe—Ni diffusion layer and hence, the steel sheet becomes disadvantageous in terms of corrosion resistance.

On the other hand, the reason the Ni coating weight is set to 8 g/m² or less is to prevent a thickness of the Fe—Ni diffusion layer from becoming larger than necessary in an annealing step.

That is, there exists a tendency that when a Ni coating weight of the Fe—Ni diffusion layer is large, a thickness of the Fe—Ni diffusion layer is usually increased, and the Fe—Ni diffusion layer becomes harder than the softened Ni layer or a iron base material by annealing. Accordingly, when the Fe—Ni diffusion layer having a thickness larger than necessary is formed, cracks are generated in the Fe—Ni diffusion layer at the time of forming a battery can leading to the exposure of the iron base material thus adversely influencing the corrosion resistance.

Further, when the thickness of the Fe—Ni diffusion layer is large, in press-forming a battery can, a load for working a thick and hard plated film becomes necessary and hence, a load is applied to a mold thus giving rise to a possibility that wear on the mold is induced.

With respect to electrolysis conditions for acquiring a Ni plating thickness, a case where a typical watt bath is used is explained. In this case, the plating thickness can be acquired under the electrolysis conditions where a bath has the bath composition containing 200 to 350 g/L of nickel sulfate, 20 to 50 g/L of nickel chloride and 20 to 50 g/L of boric acid, has pH of 3.6 to 4.6 and has a bath temperature of 50 to 65° C., current density is set to 5 to 50 A/dm² and the number of coulomb is set to approximately 170 to 1500 c/dm².

Here, besides matte Ni plating where an organic compound is not added to a plating bath except for a pit prevention agent, semi-bright plating where an organic compound referred to as leveling agent which makes a precipitated crystal surface of a plating layer smooth is added to a plating bath, and bright Ni plating where an organic compound which contains sulfur component for making a plating layer bright by making the Ni plating crystal structure fine with the further addition of a leveling agent to a plating bath are named. However, Ni plating which is formed using a bath where an organic compound containing a sulfur component is added to the bath is not preferable as Ni plating of the present invention.

This is because, in thermal diffusion treatment which follows Ni plating as a next step after, a sulfur containing compound intrudes into a plating layer and hence, brittleness is caused at the time of heat treatment thus deteriorating various properties such as corrosion resistance.

<Diffusion>

Next, heat treatment for forming a Fe—Ni diffusion layer is performed after Ni plating. This heat treatment is provided for increasing adhesiveness between base steel and a plating layer. The heat treatment also forms a Fe—Ni diffusion layer, and leaves a softened Ni plating layer on the Fe—Ni diffusion layer.

As a method for diffusing Ni by heat treatment, a method which uses a continuous annealing furnace or a method which uses a box-like annealing furnace is named. In the method which uses the continuous annealing furnace, usually, a Ni diffusion temperature which falls within a range from 600° C. to 700° C. and a Ni diffusion time which falls within a range from 30 seconds to 120 seconds are used in usual Ni diffusion by heating. An annealing atmosphere may be a non-oxidization protective gas atmosphere or a reduction protective gas atmosphere.

In the present invention, as a heat treatment method by box annealing, preferably used is the heat treatment which uses a protective gas consisting of 75% of hydrogen and 25% of nitrogen produced by an ammonia crack method referred to as hydrogen rich annealing with favorable heat transfer. In this method, favorable uniformity of temperature distribution is acquired in the inside of a steel strip in the longitudinal direction as well as in the widthwise direction of the steel strip and hence, the method has an advantageous effect that the irregularities in the Fe—Ni diffusion layer in the inside of the steel strip or the irregularities in the Fe—Ni diffusion layer between steel strips can be decreased.

<Temper Rolling>

After diffusion treatment, the steel sheet is rolled by temper rolling so that mechanical properties are imparted to the steel sheet, and the surface roughness of the Ni plating layer which forms a surface becoming an outer surface of a can is adjusted to a predetermined roughness. The temper rolling is performed such that average roughness Ra obtained by a traceable roughness gauge becomes 1.0 μm or more and 2.0 μm or less, and a maximum height Ry becomes 5 μm or more and 20 μm or less. This is because by adjusting the average roughness Ra and the maximum height Ry within such ranges, it is possible to set the average roughness Ra and the maximum height Ry after succeeding re-plating within predetermined ranges.

<Re-Plating of Semi-Bright Ni Plating>

After adjusting surface roughness to predetermined roughness by temper rolling, semi-bright Ni plating of 8 g/m² or more is applied to the Ni plating layer being a surface which will become an outer surface of a can.

When a coating weight of semi-bright plating is less than 8 g/m², a semi-bright plating effect does not appear and hence, sufficient press formability cannot be acquired. Further, there exists a possibility that scratches are generated on a wall of a battery can or seizure is generated on a mold.

The reason an Ni coating weight of the Fe—Ni diffusion layer and the softened Ni layer formed on the Fe—Ni diffusion layer is set smaller than an Ni coating weight of the semi-bright Ni plating layer is that the Fe—Ni diffusion layer formed by annealing is hard so that there exists a possibility that cracks are generated in the Fe—Ni diffusion layer at the time of forming a battery can leading to the exposure of iron base material whereby there exists a possibility that the corrosion resistance is adversely influenced. Accordingly, it is necessary to form, by re-plating, the Ni layer having a thickness equal to or more than a thickness of the Fe—Ni diffusion layer formed by annealing.

<Average Roughness Ra after Re-Plating>

It is preferable to set average roughness Ra after re-plating to 1.0 to 2.0 μm. The reason is that when average roughness Ra is less than 1.0 μm, a space between a steel sheet and a mold into which a lubricant enters at the time of press-forming becomes small and hence, scratches and seizure are liable to be generated.

On the other hand, when average roughness Ra exceeds 2.0 μm, the generation of powder particles from roughness rolls in a surface roughening step is largely increased thus inducing quality defects such as dents caused by powder particles. Accordingly, average roughness Ra exceeding 2.0 μm is not desirable from a viewpoint of the manufacture.

To prevent the generation of scratches and seizure, it is necessary to impregnate a large amount of lubricant between a die of a mold and a steel sheet. That is, a portion of a steel sheet which firstly comes into contact with the die will become a bottom portion of a battery can, and as the bottom portion is hardly worked, roughness of the steel sheet remains. Accordingly, by setting average roughness Ra after re-plating to 1.0 to 2.0 μm, it is possible to apply an amount of lubricant which can prevent the generation of scratches on a wall of a battery can or the generation of seizure to a mold to a surface of the steel sheet.

<Maximum Height Ry>

In this embodiment, a range of maximum height Ry after re-plating is also defined by the substantially same reason for defining average roughness Ra. That is, with respect to the surface roughness, tendency which is substantially equal to tendency observed with respect to average roughness Ra is also observed with respect to the maximum height Ry and hence, it is preferable to set the maximum height Ry to a value which falls within a range from 5.0 to 20 μm.

The reason for defining an upper limit and a lower limit of the range of maximum height Ry is as same as the reason set forth in conjunction with average roughness Ra.

As the reason for such setting, it is thought that when the maximum height Ry is less than 5.0 μm, a space which is defined between a steel sheet and a mold and into which lubricant enters at the time of pressing becomes small.

On the other hand, it is considered that when the maximum height Ry exceeds 20 μm, the unevenness of the surface of a Fe—Ni diffusion layer before re-plating is large so that a possibility that an iron base material which forms a substrate below the Fe—Ni alloy layer is exposed is increased. Accordingly, the maximum height Ry exceeding 20 μm is not preferable from a viewpoint of ensuring the corrosion resistance of the steel sheet.

<Definitions of Ra, Ry>

Definitions of the average roughness Ra and the maximum height Ry are described in JIS B0601-1994, and this standard should be referenced with respect to the detail of the definition. In JIS B0601-1994, arithmetic average roughness Ra (also referred to as "average roughness Ra" in this specification) is defined as an arithmetic average height of a roughness curve and is an average value of absolute value deviations from an average line. On the other hand, a maximum height Ry is defined as a height from the lowermost bottom part to the uppermost top part for every reference length. "Roughness curve" is a curve obtained through an electric filter, and is a curve obtained by removing low frequency components in a curve in cross section when an electric traceable roughness gauge is used.

<Measuring Method of Ra, Ry>

Measuring methods of Ra, Ry are not specifically limited provided that a roughness meter adopting a traceable surface roughness measuring method is used. A measurement device is based on the description of JIS-B0651-2001.

Although no other conditions are particularly specified with respect to the measuring methods except for that measurement is performed using the traceable surface roughness measurement device which is calibrated using a reference sheet, the measurement is performed as follows in this embodiment.

One example of measuring method is described as follows.

As the measurement device, a traceable surface roughness measurement device (surfcom series) made by TOKYO SEIMITSU CO., LTD. is used. JIS' 94 is adopted as the measuring condition. That is, the measurement is performed under the conditions where an evaluation length: 5 mm, a measuring speed: 0.4 mm/sec, a cut-off value: 1.0 mm, a kind of a filter: Gaussian, a measuring range: ±50 µm, gradient correction: straight, and a cut-off ratio: 400.

The average roughness Ra and the maximum height Ry depend on roll roughness and a rolling load in a temper rolling step.

The larger the roll roughness becomes, the larger the roughness of the plated steel sheet to be rolled by temper rolling becomes, while the larger the rolling load, the larger the roughness of an outermost surface of a plated steel sheet becomes.

It is possible to adjust the roughness of the outermost surface of the plated steel sheet by adjusting the rolling roughness and the rolling load.

In this embodiment, rolls used for temper rolling are not specifically limited, and EDT rolls can also be used besides shot dull rolls. That is, the rolls for temper rolling are not specifically limited provided that a method where the roughness falls within a range called for in Claims is adopted. Further, a temper rolling facility is of a usual type and is not specifically limited.

By also defining the surface roughness of semi-bright Ni plating while defining macroscopic surface roughness of the steel sheet obtained by rolling, it is possible to prevent the generation of scratches on a wall of a can or the generation of seizure to a mold.

Semi-bright plating is characterized by forming a harder film than matte Ni plating. Further semi-bright plating is also characterized in that oxidization advances slowly compared to bright Ni plating and hence, the contact resistance is not increased thus preventing semi-bright plating from adversely influencing battery characteristics. Accordingly, semi-bright plating is suitable for acquiring both press formability and battery characteristics.

It is preferable that surface roughness after semi-bright Ni plating be measured by an atomic force microscope.

Although there is also a method which observes such surface roughness by an electron microscope, it is difficult for an electron microscope to express the surface roughness with numerical values in view of irregularities and accuracy in measurement.

The measurement using a traceable roughness gauge or a laser microscope is also difficult from a viewpoint of accuracy in measurement.

Accordingly, surface roughness after semi-bright Ni plating is measured using an atomic force microscope (surface roughness measured using the atomic force microscope being referred to as "surface roughness Ra'"), and surface roughness Ra' of semi-bright plating is set to a value which falls within a range from 5 to 22 nm on a surface of a semi-bright plating film having an area of 2.5 µm×2.5 µm.

When surface roughness Ra' exceeds 22 nm, scratches are liable to be generated on a wall of a can or seizure is liable to be generated on a mold. On the other hand, when surface roughness Ra' is smaller than 5 nm, the electric resistance of an Ni plating film due to oxidization of the Ni plating film is increased thus lowering battery characteristics. Accordingly, surface roughness Ra' having such values is not preferable.

<Forming of Battery Can>

Next, a battery can is formed using a Ni-plated steel sheet of this embodiment.

Although a size of the battery can is not specifically limited, AA, AAA are main sizes used.

A method of forming a battery can is forming by drawing. A press liquid of low viscosity or water-soluble emulsion is used as a press lubrication material. A Ni-plated steel sheet is formed into a drawn cup in a first step and, thereafter, the cup is formed so as to have a diameter of a battery can through drawing in three to six stages in total, and the cup is formed into a battery can through further four stages.

As a press forming condition, the battery can is formed such that a thickness of a can wall gradually becomes equal in the direction toward an opening part of the battery can on which a negative pole cap is mounted from a bottom (positive pole terminal part) of the battery can.

As a material of the mold used for such press forming, sintered hard alloy is preferably used. However, the material of the mold is not specifically limited. In this embodiment, materials described in Table 1 can be used.

TABLE 1

| kind of material | composition | density g/m² | hardness HrA | resistance force GPa | compressive strength GPa | Young's modulus GPa | thermal conductivity W/m·K |
|---|---|---|---|---|---|---|---|
| G3 | WC—Co | 14.7 | 89.5 | 2.6 | 4.7 | 579 | 71 |
| NR8 | WC—Ni | 14.8 | 90 | 2.3 | 4.2 | 600 | 75 |
| NR11 | WC—Ni | 13.5 | 90 | 2.4 | 4.6 | 530 | 63 |
| NM15 | WC—Ni | 14 | 86.5 | 2.5 | 3.5 | 530 | 50 |
| RCCL | WC—TiC—TaC | 14.7 | 93 | 1 | 3.6 | 640 | 70 |
| TM2 | Ti—TiC—Mo | 5.2 | 54 | 0.7 | — | 250 | 9.2 |
| TW3 | Ti—TiC—Mo—W | 5.5-5.8 | 68 | 0.5 | — | 226 | 9.2 |
| DUX40 | TiC—Ni | 6.5 | 91.5 | 1.8 | 3.9 | 470 | 29 |
| SiC | SiC | 3.2 | 94 | 0.6 | 3.5 | 441 | 46 |
| $Si_3N_4$ | $Si_3N_4$ | 3.3 | 92.8 | 1.1 | 4 | 314 | 25.1 |

A lubricant used in general in press forming is roughly classified in two kinds of lubricants having low concentration, that is, a mineral-oil-based lubricant and a water-soluble-emulsion-type lubricant.

As the mineral-oil-based lubricant, a lubricant having low viscosity where kinematic viscosity (40° C.) is 40 mm²/s or less is used. The reason the lubricant having low viscosity is used is that cleaning with a neutral surface active agent can be performed without requiring an organic solvent or alkali cleaning in a cleaning step after forming a battery can and hence, the lubricant works extremely significantly in terms of an environmental load as well as a cost.

It is also possible to add a slight amount of additive such as molybdenum to the lubricant. In this embodiment, the conditions which the lubricant having low viscosity is required to satisfy are listed in Table 2.

TABLE 2

| name of product | | | mineral oil press oil |
|---|---|---|---|
| density | (15° C.) | g/cm³ | 0.89 |
| flash point | (COC) | ° C. | 190 |
| kinematic viscosity | (40° C.) | mm²/s | 30 |
| acid value | | mgKOH/g | 1.9 |
| color | | ASTM | L2.5 |
| Corrosion of copper sheet | | 100° C. × 1 h | 1a |
| pour point | | ° C. | −15 |

The water-soluble-emulsion-type lubricant is a lubricant for preventing seizure in general, and the following composition examples are listed.

Such a water-soluble-emulsion-type lubricant can use hot water in cleaning after manufacturing a can and hence, cleaning which takes into account an environment can be easily performed without using an organic solvent.

<Composition examples of water-soluble emulsion>

| component | blending | specific name of component |
|---|---|---|
| mineral oil | 40-50% | mineral oil or fatty acid ester |
| higher alcohol | 10% | t-butyl alcohol |
| surface-active agent | 5% | anionic or nonionic surface-active agent |
| alkanolamine | 5-10% | triethanolamine |
| anti-corrosion agent | 1% | benzotriazole |
| water | balance | |

Liquid having the above-mentioned composition is mixed, and is further diluted with water until the concentration becomes 2 to 10% thus producing water-soluble emulsion.

EXAMPLES

The present invention is explained hereinafter in further detail using examples and comparison examples.

Examples

A low carbon aluminum-killed steel sheet having a sheet thickness of 0.25 mm which is manufactured through cold-rolling and annealing is used as an original sheet.

The composition of a steel sheet which constitutes the original sheet is as follows.

C: 0.045%, Mn: 0.23%, Si: 0.02%, P: 0.012%, S: 0.009%, Al: 0.063%, N: 0.0036%, balance: Fe and inevitable impurities The above-mentioned steel sheet is subjected to alkali electrolytic cleaning and pickling by immersion into a sulfuric acid and, thereafter, Ni plating is applied to the steel sheet using a watt bath with a Ni coating weight of 5 to 8 g/m².

After performing Ni plating, continuous annealing is performed within a temperature range from 600° C. to 700° C. for 30 seconds to 120 seconds thus thermally diffusing Ni in the Ni plating layer and Fe in the steel sheet whereby two layers consisting of the Fe—Ni diffusion layer and the softened Ni layer are formed.

Next, temper rolling is performed such that with respect to roughness of a surface of the steel sheet which becomes an outer surface of a can, average roughness Ra becomes 1.0 μm or more and 2.0 μm or less, and a maximum height Ry becomes 5 μm or more and 20 μm or less.

Further, semi-bright plating is applied to the steel sheet by an amount of 8 g/m² or more thus manufacturing an Ni-plated steel sheet for a battery can.

After re-plating, roughness of a surface of the steel sheet is again measured, and it is confirmed that average roughness Ra is 1.0 μm or more and 2.0 μm or less, and a maximum height Ry is 5 μm or more and 20 μm or less.

A semi-bright Ni plating film formed by re-plating is measured at 10 points in the measurement of surface roughness within a measurement range of 2.5 μm×2.5 μm using an atomic force microscope (scanning-type probe microscope NanoScope III made by Digital Instruments, Inc.), and it is confirmed that the plated film is semi-bright plating having surface roughness Ra' within 5 to 20 nm, and a grain size of the Ni-plating film surface layer is smaller than a grain size of matte plating.

Ni plated steel sheets of embodiments 1 to 15 which are prepared by changing preparing conditions as described above are shown in Table 3.

TABLE 3

| example | press liquid | coating weight of diffusion layer and softened Ni g/m² | roughness measured by traceable roughness meter | | thickness after re-plating g/m² | surface roughness measured by AFM Ra (nm) | scratches on can | presence or non-presence of seizure to mold |
|---|---|---|---|---|---|---|---|---|
| | | | Ra (μm) | Ry (μm) | | | | |
| 1 | water-soluble | 5.5 | 1.1 | 5.3 | 9 | 22 | not present | not present |
| 2 | water-soluble | 5.0 | 1.9 | 19 | 10 | 15 | not present | not present |
| 3 | water-soluble | 6.0 | 1.5 | 15 | 9 | 20 | not present | not present |
| 4 | water-soluble | 7.0 | 1.0 | 10 | 15 | 15 | not present | not present |
| 5 | water-soluble | 8.0 | 1.1 | 5.5 | 10 | 6 | not present | not present |
| 6 | water-soluble | 7.0 | 1.9 | 19 | 11 | 14 | not present | not present |
| 7 | water-soluble | 6.0 | 1.5 | 12 | 13 | 9 | not present | not present |
| 8 | water-soluble | 7.5 | 1.3 | 9 | 11 | 20 | not present | not present |
| 9 | water-soluble | 8.0 | 1.2 | 12 | 10 | 17 | not present | not present |
| 10 | low viscosity | 5.5 | 1.1 | 6.0 | 9 | 22 | not present | not present |
| 11 | low viscosity | 5.0 | 2.0 | 18 | 9 | 21 | not present | not present |
| 12 | low viscosity | 6.5 | 1.4 | 15 | 10 | 17 | not present | not present |
| 13 | low viscosity | 8.0 | 1.0 | 13 | 15 | 15 | not present | not present |
| 14 | low concentration | 5.50 | 1.1 | 15 | 10 | 10 | not present | not present |

TABLE 3-continued

| example | press liquid | coating weight of diffusion layer and softened Ni g/m² | roughness measured by traceable roughness meter | | thickness after re-plating g/m² | surface roughness measured by AFM Ra (nm) | scratches on can | presence or non-presence of seizure to mold |
|---|---|---|---|---|---|---|---|---|
| | | | Ra (μm) | Ry (μm) | | | | |
| 15 | low concentration | 7.0 | 1.9 | 19 | 9 | 9 | not present | not present | water-soluble: water-soluble emulsion press liquid
low viscosity: mineral oil press liquid of low viscosity Comparison Examples In comparison examples 1 to 9 shown in Table 4, although steel sheets used for preparing the comparison examples and the preparation steps are substantially equal to those for preparing the examples of the present invention, Ni plated steel sheets are prepared by changing roughness of temper rolling rolls and Ni plating conditions for re-plating from those of the examples of the present invention.

in fourth to sixth steps such that the cup has an outer diameter of a battery can, and shoulder forming, final shoulder forming, step forming and cutting of ears are performed in seventh to tenth steps thus manufacturing a battery can for AA size battery having a can wall thickness of 0.18 mmt.

To evaluate the Ni-plated steel sheet for forming a battery can, cans are continuously manufactured, and the presence or the non-presence of seizure to a mold and scratches on the cans are checked. The result is shown in a column "scratches

TABLE 4

| comparison example | press liquid | coating weight of diffusion layer and softened Ni layer g/m² | roughness measured by traceable roughness meter | | thickness after re-plating g/m² | surface roughness measured by AFM Ra (nm) | scratches on can | presence or non-presence of seizure to mold |
|---|---|---|---|---|---|---|---|---|
| | | | Ra (μm) | Ry (μm) | | | | |
| comparison example 1 | water-soluble | [9.0] | 0.8 | 9 | 9 | [24] | present | present |
| comparison example 2 | water-soluble | [10] | 0.9 | [4.0] | 10 | 10 | present | present |
| comparison example 3 | water-soluble | 5.0 | 1.9 | 15 | [7] | 16 | present | not present |
| comparison example 4 | water-soluble | 6.0 | 1.5 | 12 | 9 | [25] | present | present |
| comparison example 5 | water-soluble | 7.0 | 1.9 | 19 | 10 | [24] | present | present |
| comparison example 6 | low viscosity | 8.0 | [0.7] | [4.5] | 10 | 17 | present | present |
| comparison example 7 | low viscosity | [9.0] | 1.0 | [3.5] | 10 | 18 | present | present |
| comparison example 8 | low viscosity | 5.50 | [0.9] | 15 | 10 | [23] | present | present |
| comparison example 9 | low viscosity | 7.0 | 1.9 | 15 | [6] | 20 | present | not present | water-soluble: water-soluble emulsion press liquid
low viscosity: mineral oil press liquid of low viscosity: out of range of the present invention Next, battery cans for AA size alkali batteries are formed by forming the Ni-plated steel sheets described in the examples and the comparison examples using two kinds of lubricants consisting of a mineral oil press liquid of low viscosity and a water-soluble emulsion.

The battery cans are formed through ten steps. As a material for forming a part of a mold which comes into contact with the steel sheet, a WC-Ni material using a Ni binder (NR-8) is used. In the first step, the steel sheet is formed into a cup by cupping (cup diameter: φ31.42 mm, drawing ratio: 1.85, blank diameter: φ52 mm), drawing is performed in second and third steps and drawing and ironing are performed on can" and "presence or non-presence of seizure to mold" in Table 3 and Table 4 respectively.

Evaluation

The Ni-plated steel sheets of the examples 1 to 15 which fall within the scope of the present invention exhibit no "generation of scratches" and no "seizure to mold" as can be clearly understood from Table 3 and hence, these Ni-plated steel sheets are used as excellent Ni-plated steel sheets for forming battery cans.

On the other hand, the Ni-plated steel sheets of the comparison examples 1 to 9 which do not fall within the scope of the present invention exhibit the "generation of scratches" and "the generation of seizure to a mold" and hence, these Ni-plated steel sheets do not have practicability.

INDUSTRIAL APPLICABILITY

According to the Ni-plated steel sheet having excellent press formability of the present invention, it is possible to provide a Ni-plated steel sheet where the generation of scratches at the time of forming a battery can by a press is suppressed and the generation of seizure to a mold can be prevented and hence, the present invention possesses an extremely high industrial applicability.

We claim:

1. A Ni-plated steel sheet for a battery can having excellent press formability, wherein
   an Fe—Ni diffusion layer and a softened Ni layer formed on the Fe—Ni diffusion layer are formed on a surface of a steel sheet corresponding to an outer surface of the battery can,
   a semi-bright Ni plating layer is formed on the softened Ni layer,
   a Ni coating weight of the Fe—Ni diffusion layer and the softened Ni layer formed on the Fe—Ni diffusion layer is set smaller than a Ni coating weight of the semi-bright Ni plating layer,
   average roughness Ra of the semi-bright Ni plating layer measured by a traceable roughness gauge is 1.0 μm or more and 2.0 μm or less, and a maximum height Ry of the semi-bright Ni plating layer measured by the traceable roughness gauge is 5 μm or more and 20 μm or less, and
   surface roughness Ra' of a surface of the semi-bright Ni plating layer in an area of 2.5 μm×2.5 μm which is obtained by an atomic force microscope falls within a range from 5 to 22 nm.

2. The Ni-plated steel sheet for a battery can having excellent press formability according to claim 1, wherein the Ni coating weight of the Fe—Ni diffusion layer and the softened Ni layer formed on the Fe—Ni diffusion layer is 5 to 8 g/m$^2$, and the Ni coating weight of the semi-bright Ni plating layer is 8 g/m$^2$ or more.

* * * * *